(12) United States Patent
Gehring et al.

(10) Patent No.: US 7,336,805 B2
(45) Date of Patent: Feb. 26, 2008

(54) DOCKING ASSISTANT

(75) Inventors: Ottmar Gehring, Kemen (DE); Harro Heilmann, Ostfildern (DE); Frederic Holzmann, Stuttgart (DE); Andreas Schwarzhaupt, Landau (DE); Gernot Spiegelberg, Heimsheim (DE); Armin Sulzmann, Oftersheim (DE)

(73) Assignee: DaimlerChrysler AG, Stuttgart (DE)

( * ) Notice: Subject to any disclaimer, the term of this patent is extended or adjusted under 35 U.S.C. 154(b) by 439 days.

(21) Appl. No.: 11/154,772

(22) Filed: Jun. 16, 2005

(65) Prior Publication Data
US 2005/0281436 A1    Dec. 22, 2005

(30) Foreign Application Priority Data
Jun. 16, 2004   (DE) .................. 10 2004 028 763

(51) Int. Cl.
| | |
|---|---|
| G06K 9/00 | (2006.01) |
| G06K 9/34 | (2006.01) |
| G06K 9/36 | (2006.01) |
| H04N 7/00 | (2006.01) |
| H04N 7/18 | (2006.01) |
| B60Q 1/48 | (2006.01) |
| G08G 1/123 | (2006.01) |
| G05D 1/00 | (2006.01) |

(52) U.S. Cl. ............... 382/104; 382/103; 382/113; 382/173; 382/181; 382/291; 348/116; 348/118; 348/148; 340/932.2; 340/933; 340/958; 340/995.25; 340/995.28; 701/1; 701/23; 701/300

(58) Field of Classification Search ........ 382/103, 382/104, 113, 173, 181, 199, 203, 291; 340/932.2, 340/933, 935, 937, 958, 995.25–995.28; 348/113, 116, 118–120, 148–149; 701/1, 701/23–28, 207–212, 300–302

See application file for complete search history.

(56) References Cited

U.S. PATENT DOCUMENTS

| | | | | |
|---|---|---|---|---|
| 4,906,940 A | * | 3/1990 | Greene et al. | .............. 382/100 |
| 4,931,937 A | * | 6/1990 | Kakinami et al. | .......... 701/300 |

(Continued)

FOREIGN PATENT DOCUMENTS

| | | |
|---|---|---|
| DE | 297 23 648 U1 | 6/1999 |
| DE | 101 41 464 | 3/2004 |
| DE | 103 23 915 | 2/2005 |
| JP | 2001-343212 | 12/2001 |
| JP | 2002-172988 | 6/2002 |
| JP | 2002-172989 | 6/2002 |

OTHER PUBLICATIONS

Robert Sedgewick, Algorithms in C, Chapter 4, pp. 35 to 49, Chapter 5, pp. 187-189, Chapter 5.6, pp. 230-249, Addison-Wesley Pub. Comp. Inc. 1998.

Paul J. Besl, A Method for Registration of 3-D Shapes, IEEE Transactions on Pattern Analysis and Machine Intelligence, vol. 14, No. 2, Feb. 1992, pp. 239-256.

*Primary Examiner*—Bhavesh M Mehta
*Assistant Examiner*—Manav Seth
(74) *Attorney, Agent, or Firm*—Davidson, Davidson & Kappel, LLC

(57) ABSTRACT

Many day-to-day driving situations require that an operator of a motor vehicle guide the motor vehicle along a specific course and bring the vehicle to a stop at a specific location, for example in a parking bay or at a loading platform. To assist a vehicle operator in such situations, a method and a suitable device for implementing this method, include detecting the potential target objects in the image data of an image sensor and identifying the potential target objects as potential destinations in a multi-stage exclusionary method, whereupon a trajectory describing an optimized travel path is computed at least in relation to the most proximate destination. By using the multi-stage exclusionary method according to the present invention, it is possible to reliably identify potential destinations in complex image scenarios solely on the basis of their geometric form, even when the destinations have not been encoded by specific symbols.

19 Claims, 3 Drawing Sheets

U.S. PATENT DOCUMENTS

| | | | |
|---|---|---|---|
| 4,970,653 A * | 11/1990 | Kenue | 701/301 |
| 5,220,508 A * | 6/1993 | Ninomiya et al. | 701/207 |
| 5,245,422 A * | 9/1993 | Borcherts et al. | 348/119 |
| 5,351,044 A * | 9/1994 | Mathur et al. | 340/901 |
| 5,386,285 A * | 1/1995 | Asayama | 340/435 |
| 5,487,116 A * | 1/1996 | Nakano et al. | 382/104 |
| 5,517,412 A * | 5/1996 | Unoura | 701/23 |
| 5,555,312 A * | 9/1996 | Shima et al. | 382/104 |
| 5,555,555 A * | 9/1996 | Sato et al. | 382/104 |
| 5,612,686 A * | 3/1997 | Takano et al. | 340/903 |
| 5,646,614 A * | 7/1997 | Abersfelder et al. | 340/932.2 |
| 5,680,313 A * | 10/1997 | Whittaker et al. | 701/300 |
| 5,790,403 A * | 8/1998 | Nakayama | 701/28 |
| 5,832,116 A * | 11/1998 | Rezzouk | 382/199 |
| 5,844,505 A * | 12/1998 | Van Ryzin | 340/988 |
| 5,991,427 A * | 11/1999 | Kakinami et al. | 382/104 |
| 6,172,601 B1 * | 1/2001 | Wada et al. | 340/436 |
| 6,507,660 B1 * | 1/2003 | Wirtz et al. | 382/103 |
| 6,744,380 B2 * | 6/2004 | Imanishi et al. | 340/937 |
| 6,794,987 B2 * | 9/2004 | Schiffmann et al. | 340/435 |
| 6,894,606 B2 * | 5/2005 | Forbes et al. | 340/435 |
| 6,952,488 B2 * | 10/2005 | Kelly et al. | 382/104 |
| 7,116,246 B2 * | 10/2006 | Winter et al. | 340/932.2 |
| 7,209,221 B2 * | 4/2007 | Breed et al. | 356/5.02 |
| 2002/0130953 A1 | 9/2002 | Riconda et al. | 348/115 |
| 2004/0056950 A1 | 3/2004 | Takeda | 348/92 |
| 2005/0002558 A1 | 1/2005 | Franke et al. | 382/154 |

* cited by examiner

DOCKING ASSISTANT

Priority is claimed to German Patent Application No. DE 10 2004 028 763.5, filed on Jun. 16, 2004, the entire disclosure of which is incorporated by reference herein.

The present invention is directed to a method for assisting vehicle guidance on the basis of image data, particularly when maneuvering trucks toward docking stations, as well as to a device suited for implementing the method.

Many day-to-day driving situations require that an operator of a motor vehicle guide the motor vehicle along a specific course and bring the vehicle to a stop at a specific location, for example in a parking bay or at a loading platform. To assist a vehicle operator in such situations, the Japanese Patent Application JP 2001-343212 A describes a camera-based system for the guided entry into a parking bay whose boundaries are marked on the road surface. The system utilizes the fact that parking bays marked on the road surface are typically bounded on the right and left by clearly visible lines (lane marking signatures). In the image data acquired by the camera integrated in the vehicle, these visual signatures (boundary lines) are identified within an image-processing unit, and their orientation is measured. Since the visual signatures are parallel straight lines, they are also reproduced as straight lines in the camera image data, so that their angular deviation from the x- and y-axis of the camera image can easily be determined. From the angular deviations of both straight-line sections relative to each other and the knowledge of the distance that separates them, the vehicle's distance to the parking bay and its orientation relative to the same can be calculated in a geometrically simple manner. The image data are presented to the driver of the vehicle on a display, directional arrows being superposed on the display to indicate how far and in which direction the vehicle needs to be controlled in order to reach the parking bay.

Correspondingly, the Japanese Patent Applications JP 2002-172988 A and JP 2002-172989 A describe how, by using the image-processing system known from the Japanese Patent Application JP 2001-343212 A, an at least partially autonomous vehicle guidance into the parking bay can be carried out, in that the lane required for parking is precalculated. However, the evaluation of the image data for purposes of positional determination requires that the signatures (boundary lines) be clearly visible to enable their angular deviation in the image data to be ascertained. In particular, a correct positional determination requires that the starting points of the visual signatures on the lane be clearly ascertainable. In reality, however, this is not always possible, due to soiling of and wear to the lane markings.

A camera-based position detection and lane control system for motor vehicles that is rugged with respect to obscuration and soiling of the visual signatures, is described in the post-published German Patent Application DE 10323915.4. It discusses determining the position of the motor vehicle relative to a visual signature, which is used to mark the destination, by matching a template to camera image data acquired from the motor vehicle's surrounding field. This requires superposing the visual signature in the field surrounding the vehicle on a template of a visual signature stored in a memory. When the existing coordinate systems are known, the position of the motor vehicle relative to the visual signature can be directly inferred, in particular, from the compression and rotation parameters of this template matching. By using template matching for the problem at hand, one very advantageously utilizes the fact that this method is highly reliable, even when the visual signature in the image data is not fully visible due to obscuration or soiling. As do the other known related art methods for assisting the driver of a motor vehicle in approaching a destination, the system described in the German Patent Application DE 10323915.4 also requires that the destination be provided with a specific, previously known signature. In order for the visual signature to be uniquely identifiable in the image data, it must be conceived in a way that makes it clearly distinguishable from other visual signatures actually existing in the surrounding vicinity or from those that are only seemingly present.

SUMMARY OF THE INVENTION

An object of the present invention is to provide a method for assisting vehicle guidance on the basis of image data, particularly when maneuvering trucks toward docking stations, as well as to provide a device suited for implementing the method, which functions without the need for affixing specific visual signatures at the destination.

The present invention provides a method for assisting guidance of a motor vehicle on the basis of image data, particularly when maneuvering trucks toward docking stations, in which image data are acquired by an imaging sensor from the surrounding field of the motor vehicle; from the acquired image data, the positional parameters of at least one potential destination relative to the motor vehicle being extracted, and, as a consequence thereof, a trajectory describing an optimized travel path being calculated in order to assist a subsequent vehicle guidance for at least one of the potential destinations. According to the method, to extract the relative positional parameters of the at least one potential destination, the image data undergo an edge detection and edge segmentation, in order to break down the image data into individual edge segments, whose interrelationships are stored in a mathematical tree structure. Subsequently, these edge segments are then analyzed to check for the presence of a geometric object that is similar to a geometric form which, typically, at least partially describes a potential destination. The detected geometric objects that correspond to the typical geometric form are analyzed for plausibility using a matching algorithm. These plausible objects undergo an additional acceptance analysis to the effect that, based on the knowledge of the imaging properties of the imaging sensor in relation to its surrounding field, the shape of the image formation of the objects in the image data is analyzed. In addition, at least that object which is accepted in this manner and which corresponds to the most proximate destination is stored, along with the corresponding relative positional data, in an object list, and, to this end, at least one trajectory describing an optimized travel path is computed.

The present invention also provides a device for assisting a motor vehicle guidance on the basis of image data, in particular for maneuvering trucks toward docking stations. The device includes an imaging sensor (10, 22) for acquiring image data from the field surrounding the motor vehicle; an image-processing unit (11) for extracting positional parameters of at least one potential destination relative to the motor vehicle from the image data; a processing unit (15) for computing at least one trajectory that describes the optimized travel path to one of the potential designations; and a system (16) for assisting in the vehicle guidance to one of the destinations. The image-processing unit (11) includes an edge detector and segmenter which extracts the relative positional parameters of the at least one potential destination from the image data. Connected downstream of the edge detector and segmenter is a unit (12) for locating objects in the image data that have geometric shapes that typically correspond at least partially to the potential destination. In addition, the image-processing unit includes a comparator unit (13) for analyzing the detected geometric objects which correspond to the typical geometric form, to check for plausibility using a matching algorithm for making a comparison with object patterns stored in a memory unit (17). A unit for acceptance analysis (14) is provided, which, based on the comparison of selected geometric objects, analyzes the shape of the image formation of the objects in the image data, based on the knowledge of the imaging properties of the imaging sensor in relation to its surrounding field. The device communicates with a data memory (18) in which at least that geometric object detected in the image data which corresponds to the most proximate destination is stored, along with the corresponding relative positional data, in an object list, and then transfers these data to a processing unit (15) communicating herewith to calculate a trajectory describing an optimized travel path, this processing unit making these data available to a subsequent driver assistance system (16).

In the system according to the present invention for assisting a motor vehicle guidance on the basis of image data, in particular for maneuvering trucks toward docking stations, including a method and a device suited for implementing this method, image data are acquired by an imaging sensor from the surrounding field of a vehicle and, from these data, the positional parameters of at least one potential destination relative to the motor vehicle are extracted. This results in the calculation of a trajectory describing an optimized travel path in order to assist a subsequent vehicle guidance for at least one of the potential destinations. In this connection, along the lines of the present invention, to extract the relative positional parameters of the at least one potential destination, the image data undergo an edge detection and edge segmentation. To that end, the image data are broken down into individual edge segments, and their interrelationships are stored in a mathematical tree structure. In a subsequent step, these edge segments are then analyzed to check for the presence of a geometric object that is similar to a geometric form which, typically, at least partially describes a potential destination. If the typical destination is a docking station for trucks at a warehouse, for example, then the typical geometric form substantially corresponds to a rectangle having roughly identical side lengths of approximately 2.5 m. Within the framework of the inventive method, the detected geometric objects that correspond to the typical geometric form are then analyzed for plausibility using a matching algorithm, these objects, which are classified as plausible, undergoing an additional acceptance analysis to the effect that, based on the knowledge of the imaging properties of the imaging sensor in relation to its surrounding field, the shape of the image formation of the objects in the image data is analyzed (thus, an image of a typical rectangular geometric form viewed from an elevated location is formed in the image data as a trapezoid that tapers toward the top). In a final method step, at least that object which is determined within the scope of the acceptance analysis and which corresponds to the most proximate destination is stored, along with the corresponding relative positional data, in an object list, and, to this end, at least one trajectory describing an optimized travel path is computed.

In this manner, a driver assistance is able to be devised by using the device according to the present invention and on the basis of the method according to the present invention, which computes a trajectory describing an optimized travel path to at least the most proximate destination, based solely on the knowledge of the geometric appearance of the destination, without having to affix specific symbols or markings.

BRIEF DESCRIPTION OF THE DRAWINGS

The present invention is elucidated in the following on the basis of advantageous exemplary embodiments and with the aid of the drawings, in which.

DETAILED DESCRIPTION

Figure 1:
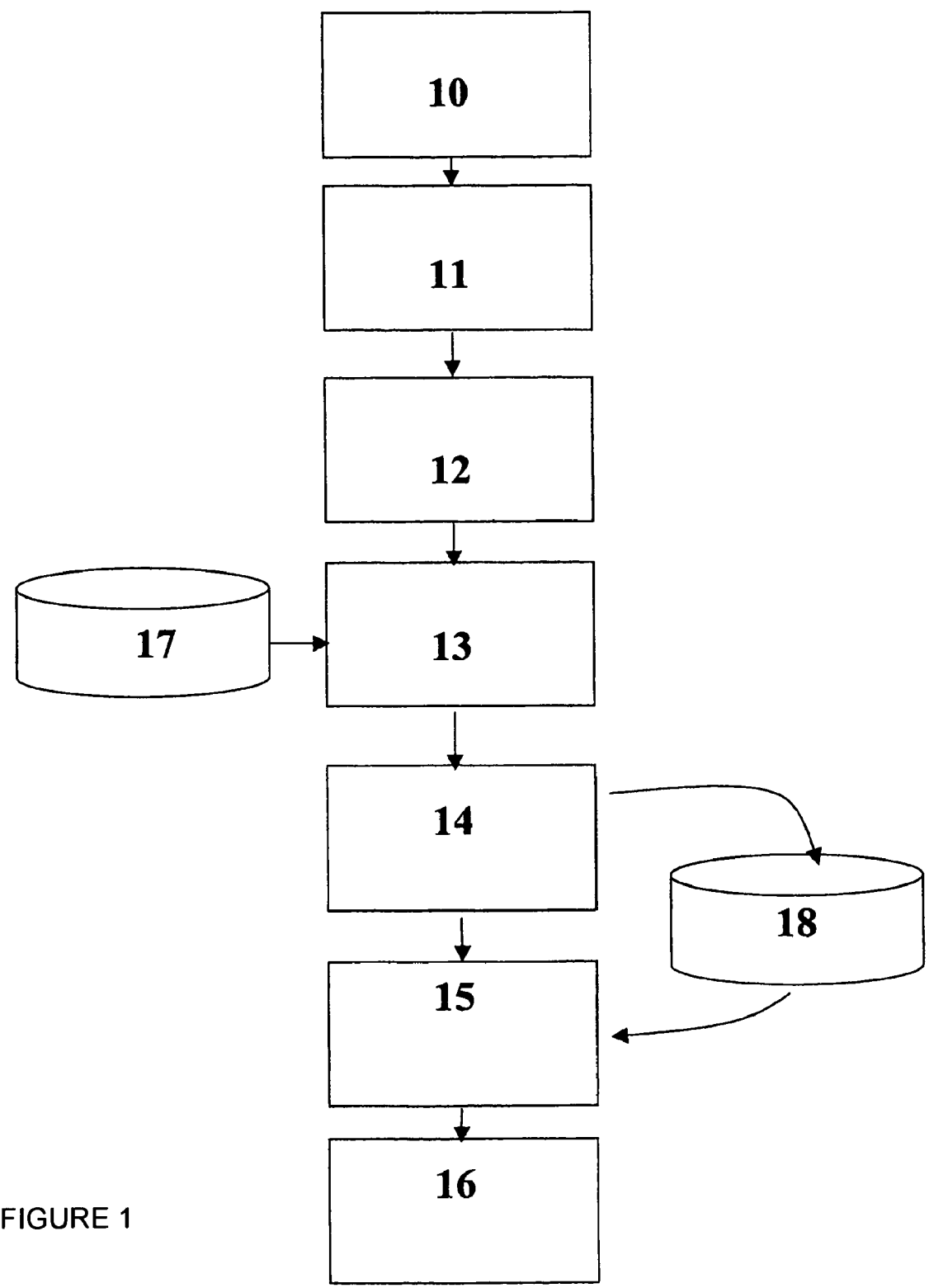
FIG. 1: shows a block diagram describing the method sequence.

As becomes clear from FIG. 1, the method according to the present invention is essentially sequential, in a first step, an image sensor (10) recording image data from the field surrounding a motor vehicle. In this connection, it is generally a question of a camera sensor which records image data in the visible light spectrum. However, it is equally conceivable that the image sensor (20) functions within an essentially invisible wavelength range, in particular in the infrared or in the ultraviolet wavelength range. Using such an image sensor makes it advantageously possible for the field surrounding the motor vehicle to be recorded to be actively illuminated by headlights which radiate light in this wavelength range, while objects or people in the area are exposed to a nonglare-type illumination. On the other hand, within the scope of the present invention, a millimeter wave radar or a lidar may be used as image sensor (10).

The image data generated by image sensor (10) are further processed in an image-processing unit (11), this unit including, in particular, an edge detector and segmenter, with whose assistance the image data are processed in such a way that, at least for one potential destination, the relative positional parameters are able to be extracted from the image data. In this context, based on the knowledge of their position and location, the extracted edges and segments are able to be advantageously stored in a hierarchically organized tree structure in the image data. Many different proven methods for creating and organizing such a hierarchical tree structure are available to one skilled in the art; reference is made here exemplarily to the comprehensive compilation and discussion of widely varying tree structures by Robert Sedgewick (R. Sedgewick, *Algorithms in C*, Chapter 4, Addison-Wesley Pub. Comp. Inc., 1990). Based on the knowledge of the geometric appearance of a destination, this hierarchical tree structure may, at this point, be processed in a unit (12) downstream from the image-processing unit (11), in order to find geometric shapes that typically correspond to the potential destination. This investigation to check for the existence of a geometric object in the image data that typically corresponds to a potential destination is performed on the basis of the hierarchical tree structure, to this end, a tree traversal algorithm known from the related art being able to be effectively used. In the case of a tree traversal algorithm, the individual branches are systematically processed, beginning with the start nodes of the tree (R. Sedgewick, *Algorithms in C*, Chapter 5.6, Addision-Wesley Pub. Comp, Inc., 1998). In this connection, based on the knowledge of the typical geometric shape of a destination, the edges and segments stored in parameters in the branches of the hierarchical tree are analyzed to check if they are able to be pieced together to form geometric objects which describe suitable, typical destinations. If the destination has a square shape, for example, then only those edge elements or segments, whose adjoining lateral surfaces substantially form a right angle and whose distances to the respective opposing side pairs are approximately of the same value, are grouped together to form an object. By already observing such elementary rules when processing the hierarchical tree structure, the subsequent outlay for processing may be limited already at this stage of the inventive method to relatively few plausible objects which are actually similar to a potential destination. Selection rules of this kind are generally able to be very well defined within the framework of the tree traversal algorithm, since typical destinations are mostly man-made architectural objects, which, as a rule, have a rectangular, in particular square, or also, however, round shape.

The geometric objects pieced together by the tree traversal algorithm, in connection with the rules derived from the geometric shape of the destination, undergo an additional acceptance analysis. In this connection, the image data are compared in a comparator unit (13), with the aid of a matching algorithm, to object patterns describing the destination stored in a memory (17). As a matching algorithm, the IPC algorithm (Besl, P. J., McKay, N. D., *A Method for Registration of 3-D Shapes*, IEEE Trans. Pattern Analysis and Machine Intelligence, vol. 14, no. 2, 1992, pp. 224-231) is particularly advantageously suited. The iterative IPC algorithm makes it possible for the objects determined with the aid of the tree transversal algorithm to be scaled and rotated in a way that minimizes the quadratic error with respect to the object's deviation from the ideal object pattern of the destination. The distance to the potential destination is also able to be easily estimated from the parameters resulting from the scaling and orientation (in particular rotation). At this point, the iterative sequence of the IPC algorithm is briefly explained by way of example:

P denotes the position of the object pattern in space. $e_i$ denotes the deviation between the stored object pattern and the segments ascertained by the tree traversal algorithm and grouped into an object. The iteration steps bear the designation n. For subsequent correction factor $c_j$, it must, therefore, follow that $P_{n+1}=P_n-c_j$. The Jacobi matrix $J_{ij}$ corresponding thereto is defined in this connection as $$J_{ij} = \frac{\partial e_i}{\partial c_j}.$$

By linear approximation, it follows that Jij*cj*=$e_i$. Within the scope of the iteration, the optimal vector, which describes the necessary scaling and rotation of the object determined by the tree traversal algorithm, must satisfy the equation $$\|J \cdot c_j - e_i\|^2$$

In this connection, this IPC algorithm is stabilized by the iteration steps and exhibits an overcontrolled convergence.

The objects, which are scaled and oriented (rotated) in comparator unit (13) by the matching algorithm, subsequently undergo a further acceptance analysis in unit (15). In one especially advantageous type of acceptance analysis, in those cases in which the surrounding field is recorded by the sensor from an elevated position, those objects which do not exhibit any distorted images, as compared to their usual geometric shapes, are rejected as potential destinations. For example, the distortion of rectangular or square geometric shapes of potential destinations is manifested as a trapezoid in an image formation. In another effective type of acceptance analysis, based on knowledge of the customary position of destinations, objects not corresponding to these specifications in the image data are rejected. For example, if an object is included in the image data whose position relative to the imaging sensor is known, then, on the basis of its image formation in the image data, an artificial horizon may be generated, on whose basis the relative position of the recognized objects is ascertained. In this manner, objects, whose position deviates from the usual position of the destination, are excluded from the further processing.

Of the geometric objects corresponding to a potential destination that remain following the acceptance analysis, at least the parameters (in particular position and distance) of that object which corresponds to the most proximate destination are stored in a memory unit (18). At least for this object, the trajectory describing an optimized travel path to the potential destination may then be computed in a processing unit (15) which is linked to memory unit (18). The steering properties and capabilities of the motor vehicle are considered in an especially advantageous manner in the calculation of a trajectory describing an optimized travel path. To that end, the device according to the present invention should have a memory in which the data required for this purpose are stored. On the other hand, it would also be conceivable to provide the device with an input unit for inputting the parameters describing the steering properties and capabilities of the motor vehicle. This makes it easily possible to adapt the computing program to various designs (different body designs or trailers). In this computing program, within the framework of the calculation of the trajectory describing an optimized travel path, those potential destinations are also rejected which are not able to be reached in consideration of the given steering properties and capabilities of the motor vehicle.

The thus calculated trajectories may then be made available to subsequent driver assistance systems (16). In this connection, the method according to the present invention is very advantageously conceived in such a way that the driver of the motor vehicle is informed about the position of at least one of the potential destinations and, in particular, about the course of the trajectory which is computed for that purpose and which describes an optimized travel path. This information may be provided by showing the ideal trajectory on a display; ideally, in this connection, the trajectory of the planned lane being superposed symbolically on camera image data representing the driver's field of view.

As a matter of course, the vehicle guidance may subsequently be carried out automatically or at least semi-automatically, on the basis of the computed trajectory to the nearest destination. It would be conceivable, for example, when working with a semi-automatic or manual vehicle guidance, for a deviation of the vehicle from the optimal trajectory describing the travel path to be indicated by audible or visual signaling means. This makes it possible, in a simple manner, for the driver of the vehicle to be assisted in observing the lateral guidance.

In the course of the lateral guidance, it is particularly advantageous for the trajectory to be constantly readapted with the aid of a Kalman filter and on the basis of a continuous image analysis (temporal updating), in order to substantially eliminate interference effects in the image data.

It is also intended, during the vehicle guidance, for the position of the objects stored as potential destinations in the object list to be continuously monitored, so that, in the event that the originally most proximate destination can no longer be easily reached due to circumstances, that potential destination is selected as a new, most proximate destination, which, on the basis of the active position of the motor vehicle, may best be reached in consideration of its steering properties and capabilities. If a new destination is thus ascertained to be the nearest destination to the vehicle, then, on the basis of the active position, a trajectory describing an optimized travel path to this destination must be computed.

Figure 2:
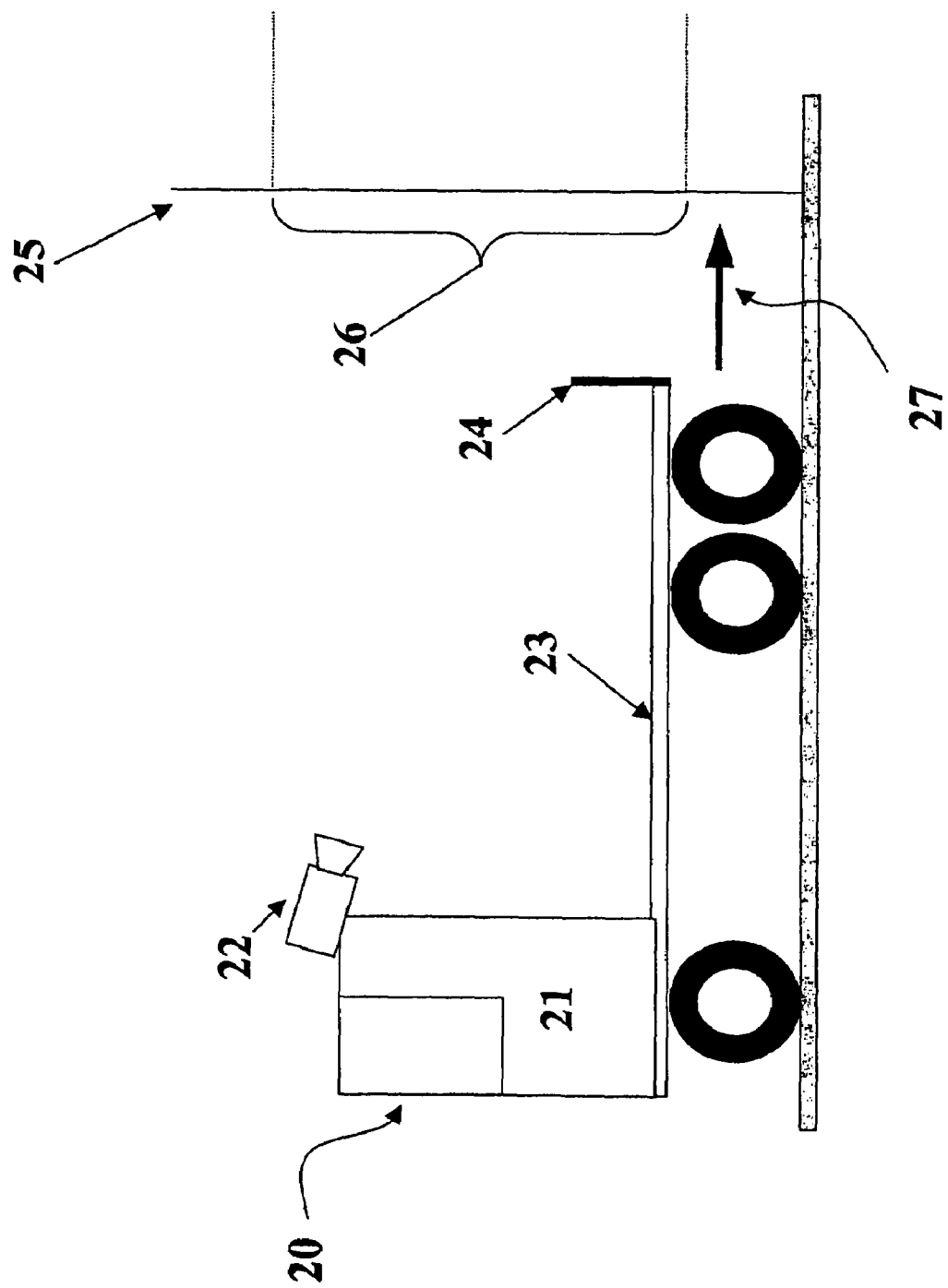
FIG. 2: shows schematically, a camera system according to the present invention mounted on a truck.
Figure 3:
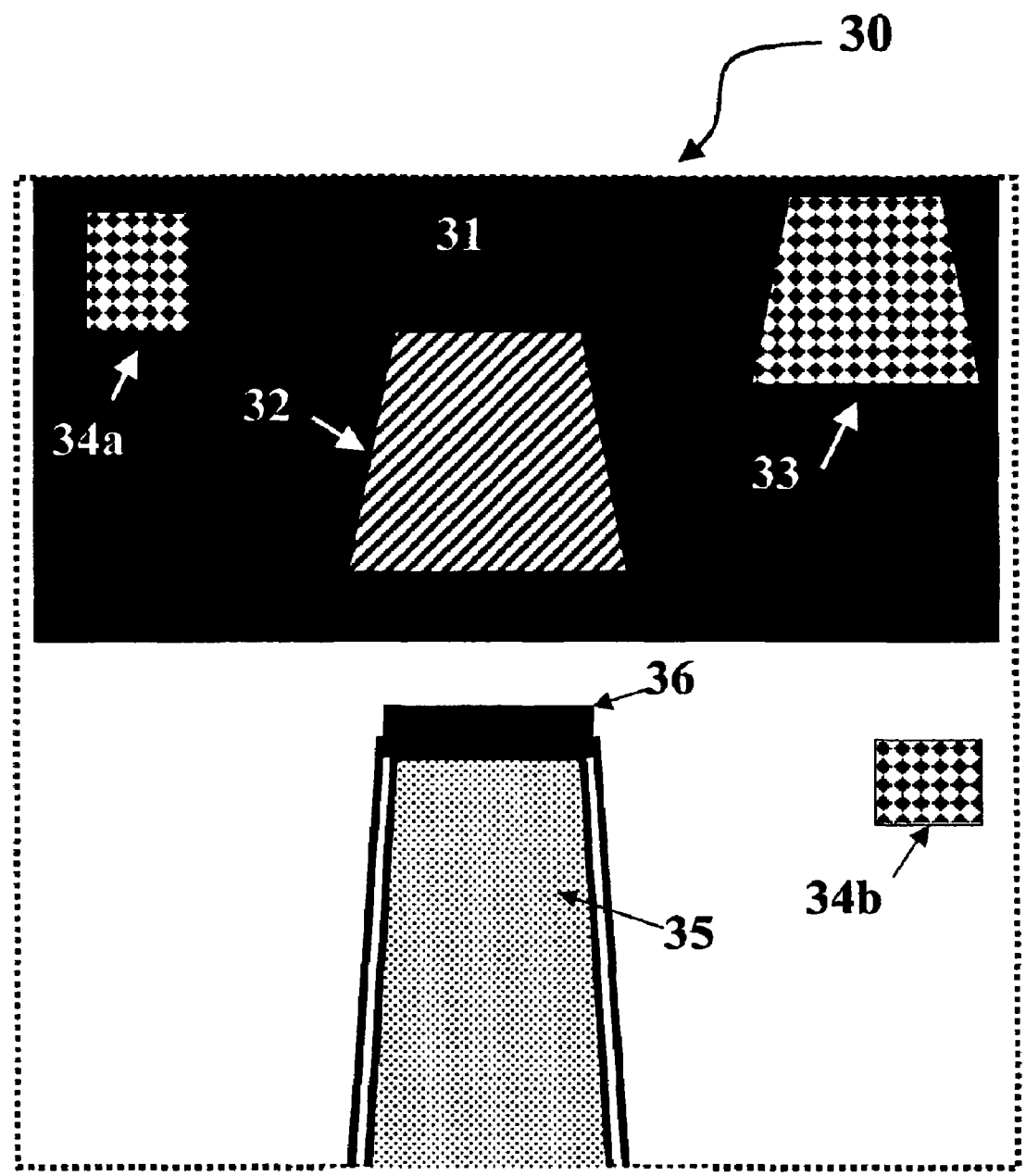
FIG. 3: shows exemplarily, image data recorded using the camera system from FIG. 2.

FIG. 2 shows exemplarily a typical situation of a truck (20) docking at a cargo door (26, 32) of a warehouse (25, 31). In this case, imaging sensor (22) is mounted above driver's cabin (21) of truck (20). Image sensor (22) is aligned in such a way that, in travel direction (27) of truck (20), it is able to record its loading platform (23, 35) as well as its loading platform end region (24, 36), as well as warehouse (25, 31) and cargo door (26, 32) situated therein. Image data (30) resulting from a corresponding image data acquisition are shown schematically in FIG. 3. Due to the elevated position of image sensor (22), a cargo door (26, 32) having a rectangular geometry is produced as a trapezoidal image in the image data. It is assumed exemplarily that, after processing of the image data in image-processing unit (11) and of the tree traversal algorithm in unit (12), objects 32, 33, 34a and 34b are identified as geometric objects typically corresponding to a potential destination. It is assumed that object 32 corresponds to the image of cargo door (26) sought as a destination. Object 33 corresponds to another rectangular structure, for example a window of warehouse (25, 31). Apparent objects 34a and 34b do not represent images of real objects, but rather result from interference in the image data which coincidentally produces edge sections and segments of a kind that results in the tree traversal algorithm piecing them together to form a potential destination object. These objects would then be scaled and oriented in comparator unit (13) by a matching algorithm. However, based on the knowledge of the camera position and camera imaging geometry, objects 34a and 34b would be eliminated within the framework of the downstream unit for acceptance analysis, since they do not have a trapezoidal shape. In addition, knowing its position relative to the camera position, the image formation of loading platform end region (36) may be retrieved during the acceptance analysis to produce an artifical horizon. On the basis of this artificial horizon, object 33 may then also be eliminated, since it is situated in a position (far above the horizon) that is abnormal for the destination (cargo door). After executing the individual method steps according to the present invention, solely object 32 remains as a potential destination in this example, so that its parameters may be stored in destination memory (18) and be retrieved for computing the trajectory describing an optimized travel path.

What is claimed is:

1. A method for assisting guidance of a motor vehicle on the basis of image data, the method comprising:
    acquired image data using an imaging sensor from a surrounding field of the motor vehicle;
    extracting from the acquired image data positional parameters of at least one potential destination relative to the motor vehicle; and
    calculating at least one trajectory describing an optimized travel path using the positional parameters so as to assist a subsequent vehicle guidance for at least one of the potential destinations,
    wherein the extracting includes:
    performing an edge detection and edge segmentation on the image data so as to break down the image data into a plurality of edge segments and storing interrelationships of the plurality of edge segments in a mathematical tree structure;
    analyzing the plurality of edge segments for the presence of a geometric object associated with a geometrical form that may at least partially describe a potential destination so as to identify one or more potential geometric objects;
    analyzing the one or more potential geometric objects for plausibility using a matching algorithm so as to identify one or more plausible objects;
    performing an additional acceptance analysis so as to identify at least one accepted object, the additional acceptance analysis including analyzing a shape of the image formation of each object in the image data based on knowledge of at least one imaging property of the imaging sensor relative to the surrounding field; and
    storing at least one accepted object that corresponds to a most proximate destination together with corresponding relative positional data in an object list.

2. The method as recited in claim 1, further comprising processing the mathematical tree structure using a tree traversal algorithm.

3. The method as recited in claim 1, wherein the potential geometric objects include at least one of rectangles and squares.

4. The method as recited in claim 1, wherein the matching algorithm includes an IPC algorithm.

5. The method as recited in claim 1, wherein, when the image sensor is disposed in an elevated position an image of a rectangular or square potential destination is formed as a trapezoid in the image data, and the acceptance analysis rejects as potential destinations those objects that do not exhibit a distorted image a typical geometric shape.

6. The method as recited in claim 1, wherein the calculation of the at least one trajectory includes considering a steering property and a capability of the motor vehicle.

7. The method as recited in claim 6, further comprising rejecting a potential destination that is not reachable given the steering property and capability of the motor vehicle.

8. The method as recited in claim 1, further comprising informing a driver of the motor vehicle about a position of at least one potential destination and about the at least one trajectory.

9. The method as recited in claim 1, further comprising performing an at least semi-automatic vehicle guidance to the most proximate destination using the at least one trajectory.

10. The method as recited in claim 9, further comprising using at least one of an audible and a visual signaling during the vehicle guidance to assist a driver of the vehicle in observing the trajectory.

11. The method as recited in claim 9, further comprising:
    continuously monitoring a position of the stored at least one accepted object during the vehicle guidance;
    selecting a new most proximate destination went the most proximate destination is no longer easily reachable, wherein the new most proximate destination is selected based on an active position of the motor vehicle and in determining the at least one accepted object that is best reachable, considering a steering properties and a capability of the vehicle; and
    computing a new trajectory describing a new optimized travel path based on the active position.

12. The method as recited in claim 1, wherein the motor vehicle is a truck and wherein the surrounding field includes a docking station.

13. A device for assisting guidance of a motor vehicle using image data, the device comprising:
- an imaging sensor configured to acquire image data from a field surrounding the motor vehicle;
- an image-processing unit configured to extract positional parameters of at least one potential destination relative to the motor vehicle from the image data;
- a processing unit configured to compute at least one trajectory describing an optimized travel path to a potential designation; and
- a vehicle guidance system configured to assist in guiding the vehicle to the potential destination,
- wherein the image-processing unit includes:
  - an edge detector and segmenter for extracting relative positional parameters of the at least one potential destination from the image data;
  - a locating unit disposed downstream from the image processing unit and configured to locate corresponding objects in the image data having geometric shapes corresponding at least partially to the at least potential destination;
  - a memory unit for storing object patterns;
  - a comparator unit configured to analyze the corresponding geometric objects, to check for plausibility using a matching algorithm for comparing the object patterns stored in the memory unit;
  - a data memory storing the geometric object detected in the image data corresponding to the most proximate destination is stored, along with the corresponding relative positional data, in an object list;
  - an acceptance analysis unit configured to analyze a shape of an image formation of the objects in the image data based on the knowledge of the imaging properties of the imaging sensor in relation to its surrounding field, to communicate with the data memory, and to transfer the most proximate destination to the processing unit.

14. The device as recited in claim 13, wherein the imaging sensor includes at least one of a camera, a laser scanner and a millimeter wave radar.

15. The device as recited in claim 13, wherein the imaging sensor is disposed at an elevated position on the vehicle from where the imaging sensor to observe a part of the field surrounding the motor vehicle relevant to the driving task.

16. The device as recited in claim 15, wherein the imaging sensor is mounted in such a way that an image of at least one portion of the motor vehicle is included in the image data.

17. The device as recited in claim 13, wherein the vehicle guidance system communicates with at least one of a steering, an acceleration and a braking equipment of the motor vehicle so as to be able to act on the equipment at least semi-autonomously.

18. The device as recited in claim 13, wherein the vehicle guidance system includes at least one of a visual and an audible output for communicating with a driver of the motor vehicle.

19. The device as recited in claim 13, wherein the motor vehicle is a truck and the surrounding field includes a docking station.

* * * * *